Figure 1:
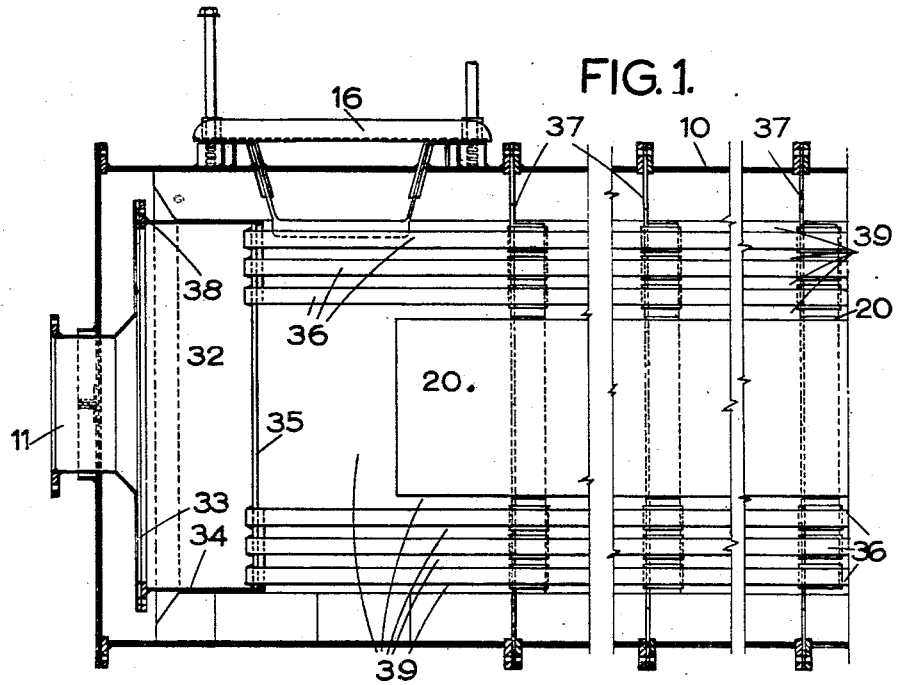

May 27, 1958   J. T. FALLON   2,836,399
CONTINUOUS-FLOW AIR OR/AND GAS HEATERS
Filed Aug. 19, 1954   3 Sheets-Sheet 1

INVENTOR
J. T. FALLON
BY Wilkinson + Mawhinney
ATTORNEYS.

United States Patent Office 2,836,399
Patented May 27, 1958

2,836,399
CONTINUOUS-FLOW AIR OR/AND GAS HEATERS

John Thomas Fallen, Olton, Birmingham, England

Application August 19, 1954, Serial No. 451,011

Claims priority, application Great Britain
August 21, 1953

6 Claims. (Cl. 257—236)

This invention relates to continuous-flow air or/and gas heaters embodying a tubular heat-exchange system by which heat is transferred from a hot gas or mixture of gases, derived from a combustion chamber in which fuel is burnt continuously or from an external source, to the air or/and gas to be heated.

Heaters of this kind may be used, among other purposes, for providing the hot-air blast for cupolas and other kinds of furnaces; they may also be used for heating gases for various industrial purposes.

The combustion products of commonly used hydrocarbon fuels, such as coal gas, fuel oil, kerosene, pulverised coal or emulsions of pulverised coal in oil, when efficiently burnt, are generated at temperatures so high as to call for dilution with colder gases before they can be alowed to come into contact with metal parts such as the tubes of the heat-exchanger system. Similar considerations may sometimes apply when hot gases form an external source, e. g. waste gases from industrial processes, are used as the heating medium.

It has been a common practice hitherto to dilute such combustion products or other hot gases with large volumes of air, and a consequential loss of overall thermal efficiency (measured by the percentage of generated heat units actually transferred to the air to be heated) has been accepted.

The present invention aims at obtaining sufficient reduction of the temperature of the combustion products or other hot gases before encountering the heat-exchange system to enable the latter to be made of reasonably inexpensive materials with a better overall thermal efficiency than has hitherto been generally obtained.

This invention includes both an improved method and an improved apparatus.

In the method of air or/and gas-heating according to this invention the hot gas or gas-mixture freshly derived from the combustion chamber or external source is, on entry into the heat-exchange system, caused to be diluted with several times its volume of gas or gas-mixture, which has previously been derived from the same source and has already circulated through the major part at least of the heat-exchange system, the greater part of the gas or gas-mixture derived from the combustion chamber or external source being thereby circulated through the major part at least of the heat-exchange system more than once before being exhausted, so that the mass-flow of such gas or gas-mixture through the major part at least of the heat-exchange system is several times the mass-flow of such gas or gas-mixture entering and leaving the heat-exchange system.

An apparatus according to this invention for carrying out the method as defined above comprises a tubular heat-exchanger provided with inlet and exhaust openings for the air or gas which receives heat, an outlet for spent hot gas, and a chamber, provided with combuistion means for generating hot gas, or receiving hot gas from an external source, said chamber terminating in a discharge nozzle, and a venturi tube coaxial with said nozzle and constituting therewith an injector device so disposed that the jet of fresh hot gas issuing from the nozzle entrains a surrounding layer of hot gas that has traversed the major part at least of the tubular heat exchanger.

The discharge end of the venturi tube is preferably provided with a tubular extension, which constitutes a mixing tube and ensures that the gases discharged from the venturi tube enter the heat-exchange system at a point remote from the inlet of the venturi tube.

The tubular heat-exchange system is preferably of the contra-flow type providing recuperative heat-transfer, but according to a feature of the invention, the air or gas to be heated, before entering the tubular heat-exchange system proper, is passed through a jacket surrounding the injector nozzle hot gas generating or receiving chamber for cooling the latter, the heat so extracted being utilised for pre-heating such air or gas before it enters the tubular heat-exchange system.

This arrangement, when applied to an air- or gas-heater including a hot gas generating combustion chamber, is calculated to minimise the risk of melting the inside of the refractory lining of the combustion chamber, which would be liable to occur if the refractory wall were thick enough to reduce heat losses from the combustion chamber to negligible proportions, having regard to the fact that it is not contemplated to supply dilution air, in excess of that required to ensure complete combustion, to the combustion chamber. By providing a thinner refractory wall, which allows an intentional small heat-loss from the combustion chamber, a sufficient temperature gradient can be maintained in the refractory wall to keep it from melting on the inside.

The injector device, which causes the gases leaving the nozzle to be diluted with a larger volume of the same gases which have been circulated and recirculated through the heat-exchange system, requires for its effective action that the gases leave the nozzle with high kinetic energy.

When the nozzle constitutes the outlet of a built-in combustion chamber, the kinetic energy of the gases leaving the nozzle is furnished in part by the energy released by the combustion and in part by precompression of the fuel/air mixture supplied to the combustion chamber. When, however, an external source of hot gas is used for feeding the nozzle, it will then be necessary to furnish the necessary kinetic energy by establishing a sufficient pressure drop across the nozzle. If the spent heating gases are exhausted to atmosphere, the pressure of these gases within the heat-exchanger system will approximate to atmospheric and the necessary pressure drop across the nozzle will be present if the external source supplies the hot gases at a pressure considerably above atmospheric. More usually, however, as for instance when hot waste gases from industrial processes are used as the heating medium, the hot gases will be at or near atmospheric pressure when they enter the nozzle.

The required pressure drop across the nozzle may in such cases be obtained, according to a feature of this invention, by providing the air or/and gas heater with a suction pump for maintaining a partial vacuum within the heating gas spaces of the heater and for exhausting the spent heating gases against atmospheric pressure.

Figure 1A:
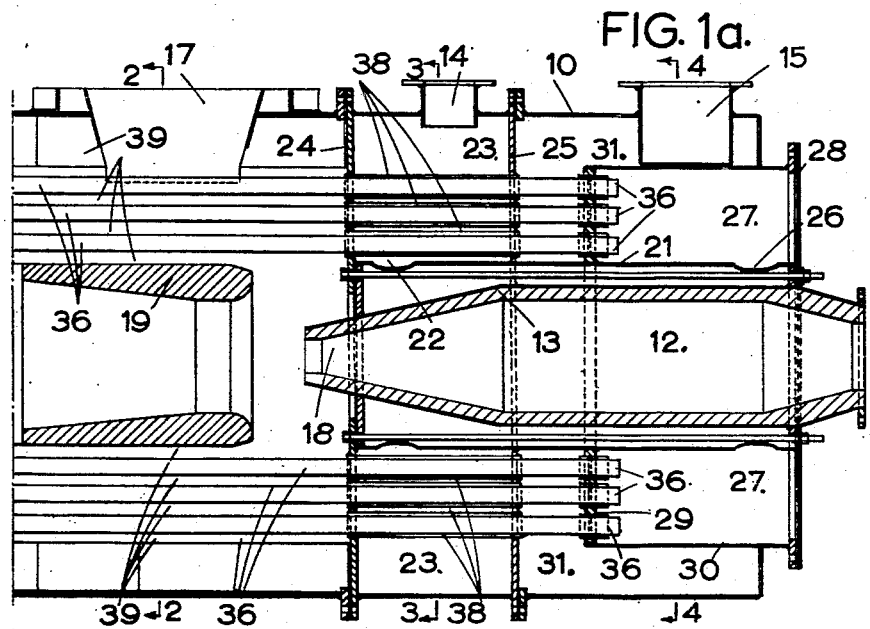
Figure 2:
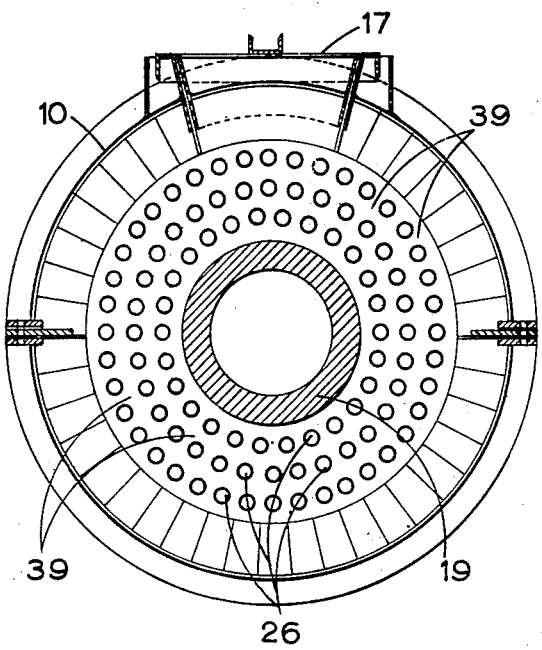
Figure 3:
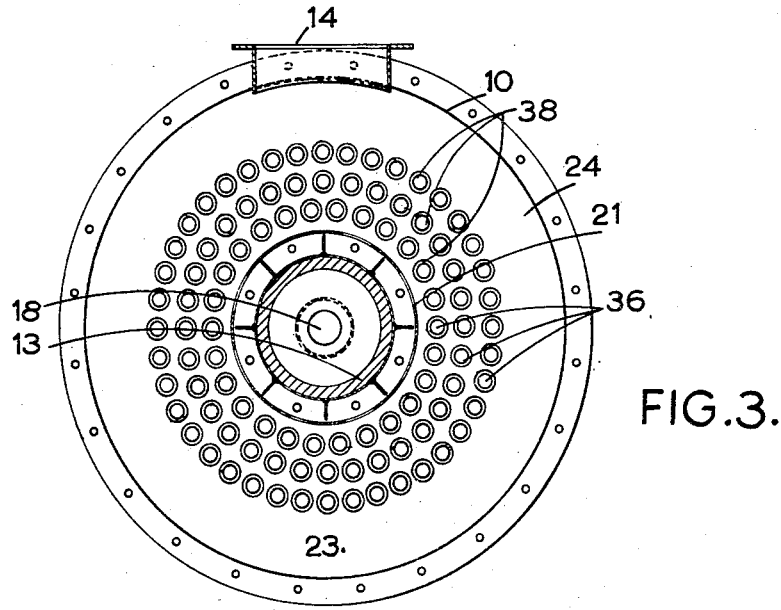
Figure 4:
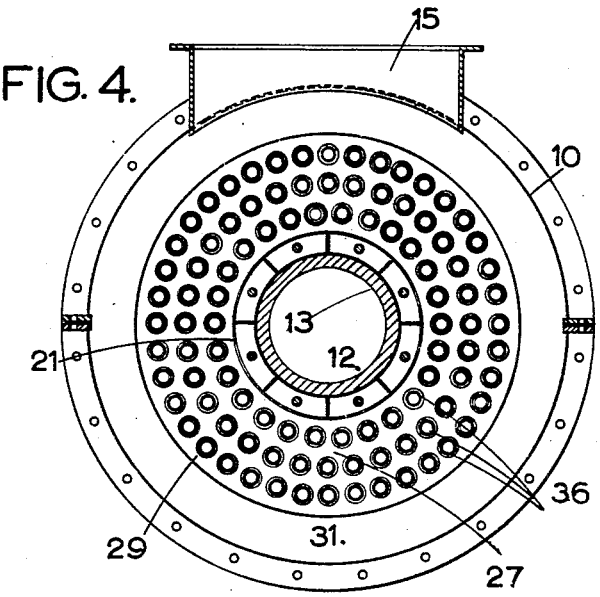
Figure 5:
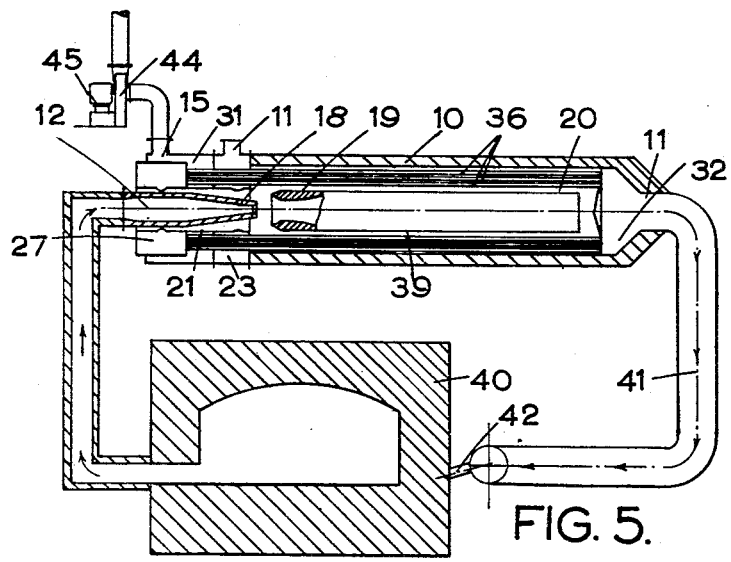

The accompanying drawings illustrate an embodiment of the invention and an adaptation thereof, in which the waste gases of a furnace are used for heating the furnace air-blast, by way of example only and without implied limitation of the scope of the invention as defined in the appended claims. In the drawings, Figure 1 is a vertical axial section of the left hand end of an air or gas heater;

Figure 1a is a vertical axial section of the right hand end of the same (continuation of Figure 1);

Figures 2, 3 and 4 are sections on the lines 2—2, 3—3 and 4—4 of Figure 1 respectively; and Figure 5 is a schematic sectional view of an air heater as illustrated in Figures 1 to 4 adapted to utilise the waste gases of a furnace for heating the air-blast of the same furnace.

Referring to Figures 1 to 4 of the drawings, the air (or gas) heater comprises a cylindrical casing 10 in one end plate of which is an outlet 11 for heated air (or gas), hereinafter referred to for convenience as "air." In the other end of the casing is coaxially disposed a cylindrical combustion chamber 12, lined with refractory material 13, and provided with conventional means (not illustrated) for introducing and burning in atmospheric, or oxygen-enriched, air a suitable gaseous or liquid fuel, the combustion air being preferably supplied under superatmospheric pressure.

The casing is further provided with an inlet 14 for air to be heated and an outlet 15 for spent hot gaseous combustion products from the combustion chamber, and with explosion (or excess) pressure relief plugs 16 and 17.

The combustion chamber 12 terminates in an injector nozzle 18 which discharges high temperature gaseous combustion products into the inlet end of a coaxial venturi tube 19 whose outlet end is provided with a long extension tube 20. The combustion chamber and nozzle are surrounded by a coaxial tube 21 defining an annular jacket round the combustion chamber and nozzle. The part of this jacket surrounding the nozzle communicates by openings 22 with an air inlet collector space 23, communicating with the air inlet 14, and defined by transverse header plates 24 and 25, while the end of the jacket remote from the nozzle communicates by other openings 26 with an intermediate air collector space 27 surrounding the combustion chamber and defined by a casing end plate 28, a third transverse header plate 29 and an internal cylindrical wall 30. Between the second and third header plates 25 and 29, and between the outer casing 10 and the internal cylindrical wall 30 is a collector space 31 communicating with the outlet 15 for spent hot gas.

The heated air outlet 11 communicates with an air outlet collector space 32 defined by an end plate 33, a cylindrical wall 34 and a fourth transverse header plate 35, which is situated beyond the open discharge end of the tube 20.

The annular space 39 within the casing surrounding the venturi tube 19, and its extension tube 20, and bounded by the header plates 24 and 35 constitutes the hot gas circulating space of the tubular heat-exchanger. This space is traversed by a number of air tubes 36 parallel to the axis of the casing 10 and extending from the header plate 29 to the header plate 35. The extension tube 20 is supported by bulkheads 37, which are perforated to accommodate the air tubes 36 with clearance. Where each tube 36 passes through the inlet air collector space 23, it is jacketed by a coaxial outer tube 38 extending from the header plate 25 to the header plate 24 and affording communication between the main hot gas circulating space 39 and the spent hot gas collector space 31.

The nozzle 18 and venturi tube 19 constitute an injector device by which the jet of high temperature gaseous combustion products issuing from the nozzle entrain a larger quantity of the same gases which have traversed the main gas circulating space from the outlet of the tube 20 to the inlet of the venturi tube 19, and have been reduced in temperature by heat-exchange with the air flowing through the tubes 36 in the opposite direction. These gases are mixed with the fresh hot gases of the nozzle jet in the extension tube 20 and discharged from its outlet end into the main gas circulating space 39. There is thus set up, through the venturi tube 19, its extension tube 20, and the main gas circulation space 39 of the heat-exchanger a continuous circulation and re-circulation of gaseous combustion products whose mass-flow is considerably greater than that of the nozzle jet, and whose mean temperature is considerably less, while the heat content of the combustion products is conserved for transfer to the air to be heated. If cold air were used for diluting and reducing the temperature of the combustion products, the heat units expended in raising the temperature of the dilution air from its initial (atmospheric) temperature to the exhaust temperature would be wasted.

The air to be heated enters the inlet collector space 23, where it passes over the tubes 38 conveying partially spent gaseous combustion products from the main hot gas circulation space 39 to the spent gas collector space 31, and is thereby preheated. It then passes through the jacket 21, thus serving to cool the combustion chamber 12 and nozzle 18 and being itself further preheated, into the intermediate air collector space 27, whence it flows through the tubes 36 of the main heat-exchanger system into the air outlet collector space 32, in contraflow with the hot combustion products passing through the main hot gas circulation space 39 and the tubes 38, and being heated thereby to the required temperature.

In the modified arrangement illustrated in Figure 5 the heater 10 etc. is used for heating the air blast of a furnace 40, the air outlet 11 being connected by a pipe 41 of the blast tuyeres 42 of the furnace; and the offtake gases of the furnace itself are used for heating the air, being conveyed to the chamber 12 of the air heater by means of a refractory-lined pipe 43. In this case the chamber 12 is not provided with combustion means but merely receives the hot combustion products of the furnace.

Since the latter are at substantially atmospheric pressure, the spent gas outlet 15 of the air heater is connected to an exhaust pump 44 driven by a motor 45, which pump maintains sub-atmospheric pressure in the hot gas spaces of the heater and exhaust the spent hot gas against atmospheric pressure. In this way sufficient pressure difference is maintained across the nozzle 18 to furnish the jet issuing from the nozzle with sufficient kinetic energy to maintain the injector action of the nozzle 18 and venturi tube 19.

The embodiments of the invention in which an exclusive property or privilege is claimed are defined as follows:

1. Apparatus for heating a gaseous fluid by non-mixing heat-exchange with a hot gas comprising a tubular heat exchanger, said exchanger comprising a number of parallel tubes and having an axial space therein surrounded by said tubes, means for causing the heat-receiving fluid to traverse said tubes, means independent of said heat exchanger for introducing hot heat-yielding gas into said space comprising a chamber having a hot gas discharge nozzle extending into said axial space and a venturi open at both ends to said axial space and having an annular entry at one end surrounding said nozzle and a discharge outlet at its opposite end for discharging the hot gas into said axial space, said heat exchanger having means including a tubular extension of the venturi discharge outlet for causing said hot gas to traverse the major portion of said axial space and return outside said tubular extension in scrubbing contact with the tubes of said tubular heat exchanger to that portion of said axial space surrounding the nozzle and venturi entry, said hot gas introducing means being adapted to supply the hot gas to the nozzle at a pressure exceeding the ambient pressure of the returned gas surrounding the nozzle and venturi entry so as to produce expansion of the hot gas issuing from the nozzle sufficient to sustain its injector action and thereby entrain into the venturi entry a surrounding layer of hot gas that has traversed the major portion of the heat exchanger in scrubbing contact with the tubes.

thereof and has thereby parted with some of its heat and become partially cooled, said apparatus further including an outlet for spent hot gas, a cylindrical casing, in which the hot gas-introducing chamber and nozzle, the venturi tube and its tubular extension are disposed coaxially and which includes an inlet opening and an outlet opening for the heat-receiving gaseous fluid, and within said casing two header plates defining between them an inlet collector space surrounding said nozzle, said space communicating with said inlet opening, a third header plate defining between it and one end of the casing an intermediate collector space surrounding the end remote from the injector nozzle of the hot gas-introducing chamber, a jacket surrounding the nozzle and hot gas-introducing chamber and communicating with both said collector spaces, a fourth header plate disposed between the open end of said venturi tubular extension and the end of the casing remote from the hot gas-introducing chamber and defining with the last-named casing end an outlet collector space communicating with said outlet opening for gaseous fluid; and in which the tubes of the tubular heat-exchanger traversed by the heat-receiving gaseous fluid extend from said third header plate to said fourth header plate and convey the heat-receiving gaseous fluid from said intermediate collector space to said outlet collector space; said apparatus further comprising other tubes extending from one to the other of said two first-named header plates for conveying partially spent hot gas from the space between said fourth header plate and one of said two first-named header plates to the space between said third header plate and the other of said two first-named header plates, said last-named space communicating with the outlet for spent hot gas.

2. Apparatus as claimed in claim 1, in which each of the tubes traversed by heat-receiving gaseous fluid is coaxially surrounded by one of the tubes extending from one to the other of the two first-named header plates so as to be jacketed by partially spent hot gas where it traverses the inlet collector space.

3. Apparatus for heating a gaseous fluid by non-mixing heat-exchange with a hot gas comprising a tubular heat exchanger, said exchanger comprising a number of parallel tubes and having an axial space therein surrounded by said tubes, means for causing the heat-receiving fluid to traverse said tubes, means independent of said heat exchanger for introducing hot heat-yielding gas into said space comprising a chamber having a hot gas discharge nozzle extending into said axial space and a venturi open at both ends to said axial space and having an annular entry at one end surrounding said nozzle and a discharge outlet at its opposite end for discharging the hot gas into said axial space, said heat exchanger having means including a tubular extension of the venturi discharge outlet for causing said hot gas to traverse the major portion of said axial space and return outside said tubular extension in scrubbing contact with the tubes of said tubular heat exchanger to that portion of said axial space surrounding the nozzle and venturi entry, said hot gas introducing means being adapted to supply the hot gas to the nozzle at a pressure exceeding the ambient pressure of the returned gas surrounding the nozzle and venturi entry so as to produce expansion of the hot gas issuing from the nozzle sufficient to sustain its injector action and thereby entrain into the venturi entry a surrounding layer of hot gas that has traversed the major portion of the heat exchanger in scrubbing contact with the tubes thereof and has thereby parted with some of its heat and become partially cooled, said apparatus further including an outlet for spent hot gas, in which the heat-exchanger is of the contra-flow type, said apparatus further including a casing having an inlet opening and an outlet opening for heat-receiving gaseous fluid, partition means in said casing defining an inlet collector space communicating with the inlet opening for heat-receiving gaseous fluid, partition means in said casing defining an intermediate collector space communicating with the tubular heat-exchanger, and a jacket surrounding the hot gas-introducing chamber and the injector nozzle, one end of said jacket communicating with said inlet collector space and the other end of said jacket communicating with said intermediate collector space.

4. Apparatus for heating a gaseous fluid by non-mixing heat-exchange with a hot gas comprising a tubular heat exchanger, said exchanger comprising a casing, a number of parallel tubes within said casing, and having an axial space therein surrounded by said tubes, means for causing the heat-receiving fluid to traverse said tubes, means independent of said heat exchanger for introducing hot heat-yielding gas into said space comprising a chamber having a hot gas discharge nozzle extending into said axial space and a venturi open at both ends to said axial space and having an annular entry at one end surrounding said nozzle and a discharge outlet at its opposite end for discharging the hot gas into said axial space, said heat exchanger having means including a tubular extension of the venturi discharge outlet for causing said hot gas to traverse the major portion of said axial space and return outside said tubular extension in scrubbing contact with the tubes of said tubular heat exchanger to that portion of said axial space surrounding the nozzle and venturi entry, said hot gas introducing means being adapted to supply the hot gas to the nozzle at a pressure exceeding the ambient pressure of the returned gas surrounding the nozzle and venturi entry so as to produce expansion of the hot gas issuing from the nozzle sufficient to sustain its injector action and thereby entrain into the venturi entry a surrounding layer of hot gas that has traversed the major portion of the heat exchanger in scrubbing contact with the tubes thereof and has thereby parted with some of its heat and become partially cooled, said apparatus further including an outlet for spent hot gas.

5. Apparatus as claimed in claim 4, in which the heat-yielding hot gas, derived from an external source, enters the apparatus at least approximately at atmospheric pressure, and which further includes a suction pump for maintaining said hot gas within the apparatus at subatmospheric pressure and for exhausting the spent hot gas against atmospheric pressure.

6. Apparatus as claimed in claim 4 including jacket means surrounding said hot gas chamber and nozzle and means for causing the heat-receiving gaseous fluid to circulate first through said jacket means before traversing the tubes of said heat exchanger.

References Cited in the file of this patent

UNITED STATES PATENTS

| | | |
|---|---|---|
| 1,719,684 | Besta | July 2, 1929 |
| 1,749,654 | Wyndham et al. | Mar. 4, 1930 |
| 1,765,657 | Coffey | June 24, 1930 |
| 1,938,699 | Huet | Dec. 12, 1933 |
| 2,224,544 | Keller | Dec. 10, 1940 |